US010248432B2

(12) United States Patent
Yoshihara

(10) Patent No.: US 10,248,432 B2
(45) Date of Patent: Apr. 2, 2019

(54) INFORMATION PROCESSING APPARATUS INCLUDING MAIN SYSTEM AND SUBSYSTEM

(71) Applicant: CANON KABUSHIKI KAISHA, Tokyo (JP)

(72) Inventor: Toshio Yoshihara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 134 days.

(21) Appl. No.: 14/837,649

(22) Filed: Aug. 27, 2015

(65) Prior Publication Data
US 2016/0062775 A1 Mar. 3, 2016

(30) Foreign Application Priority Data

Aug. 28, 2014 (JP) ................. 2014-174492

(51) Int. Cl.
G06F 1/32 (2006.01)
G06F 9/4401 (2018.01)
G06F 1/3234 (2019.01)
(52) U.S. Cl.
CPC ............ G06F 9/4418 (2013.01); G06F 1/325 (2013.01); Y02D 10/44 (2018.01)
(58) Field of Classification Search
None
See application file for complete search history.

(56) References Cited

U.S. PATENT DOCUMENTS

| 7,149,888 | B1* | 12/2006 | Hart ...................... G06F 9/4406 713/2 |
| 9,104,420 | B2* | 8/2015 | Park ...................... G06F 1/3275 |
| 2004/0064746 | A1* | 4/2004 | Nishimoto ............ G06F 9/4403 713/323 |
| 2006/0069904 | A1* | 3/2006 | Hatakeyama ......... G06F 9/4405 713/1 |
| 2007/0011200 | A1* | 1/2007 | Park ...................... G06F 9/4401 |
| 2009/0094450 | A1* | 4/2009 | Krzyzanowski .......... G06F 8/65 713/100 |
| 2009/0207423 | A1* | 8/2009 | Shimizu ............. G03G 15/5004 358/1.1 |

(Continued)

FOREIGN PATENT DOCUMENTS

| JP | 2009223866 A | 10/2009 |
| JP | 2011022973 A | 2/2011 |
| JP | 2014116888 A | 6/2014 |

Primary Examiner — Paul Yen
(74) Attorney, Agent, or Firm — Canon U.S.A., Inc. IP Division

(57) ABSTRACT

An information processing apparatus according to an exemplary embodiment of the present invention includes a main system and a subsystem. The main system includes a first control unit configured to, before the information processing apparatus shifts to a power-saving state, develop a boot image to be executed by the subsystem in a memory of the subsystem. The subsystem includes a second control unit configured to, in a case where the information processing apparatus returns from the power-saving state, issue an instruction to execute the boot image developed in the memory. The subsystem further includes a third control unit configured to execute the boot image developed in the memory according to the instruction issued by the second control unit.

23 Claims, 10 Drawing Sheets

(56) References Cited

U.S. PATENT DOCUMENTS

2010/0095143 A1* 4/2010 Yamaji .................. G06F 9/4418
 713/323
2014/0340704 A1* 11/2014 Yamaguchi ............. G06F 13/00
 358/1.14

* cited by examiner

RETURN FROM POWER SAVING STATE

RETURN FROM POWER SAVING STATE (CONVENTIONAL)

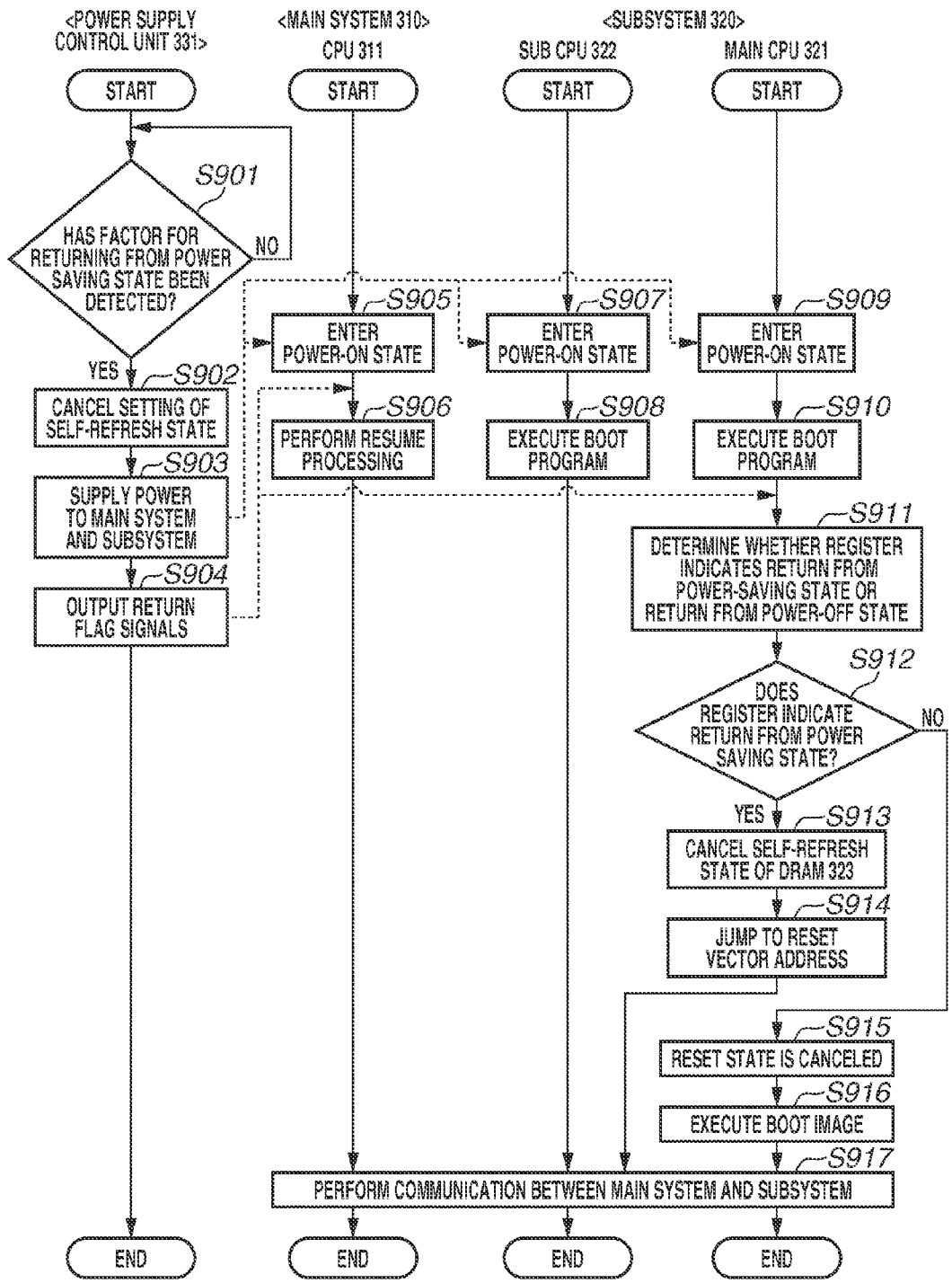

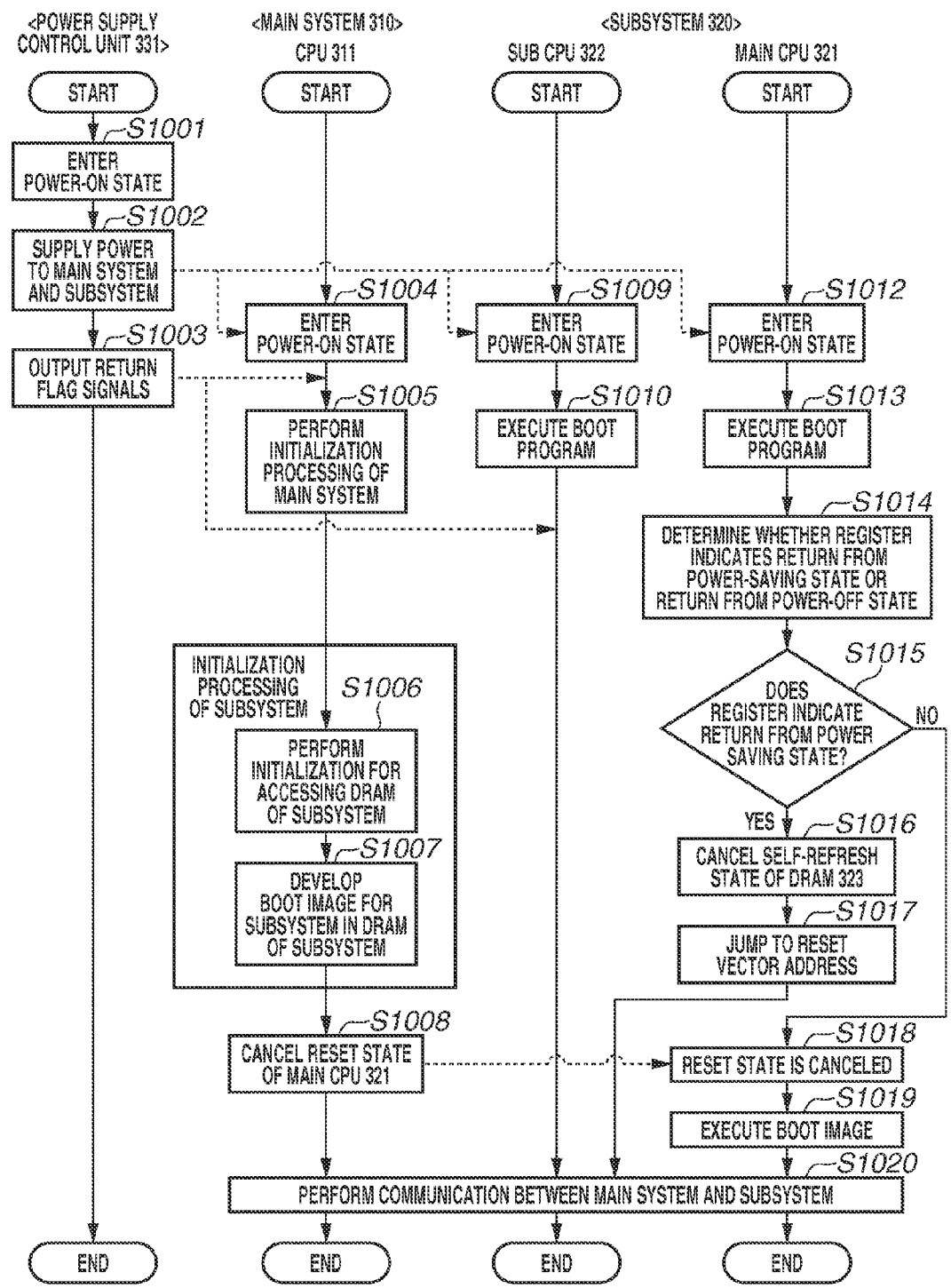

INFORMATION PROCESSING APPARATUS INCLUDING MAIN SYSTEM AND SUBSYSTEM

BACKGROUND OF THE INVENTION

Field of the Invention

The present invention relates to a technique for returning an information processing apparatus including a main system and a subsystem from a power-saving state at a high speed.

Description of the Related Art

With a growing awareness of power saving, recent information processing apparatuses have been set to enter a power-saving state more frequently than conventional information processing apparatuses. Thus, at the time of when a user attempts to use a copying machine, the copying machine is more likely to be in the power-saving state. It has therefore become more important than before to enable the copying machine to return from the power-saving state in a short time to execute a job such as copying.

On the other hand, the copying machine may include a controller including two systems, i.e., a main system and a subsystem. The main system controls a response to a user operation via an operation unit and reception of a print request via a network. The subsystem controls a scanner device and a printer device to control execution of jobs such as copying and printing.

Recently, the copying machine has restricted the supply of power to the main system and the subsystem when entering the power-saving state, in order to make power consumption during standby as low as possible to achieve the reduction of power consumption (see Japanese Patent Application Laid-Open No. 2009-223866).

In an image forming apparatus discussed in Japanese Patent Application Laid-Open No. 2009-223866, the supply of power to a central processing unit (CPU) of the main system and a CPU of the subsystem is stopped when the image forming apparatus has shifted to the power-saving state (first power-saving mode), so that the power consumption in the power-saving state is reduced.

However, in the image forming apparatus discussed in Japanese Patent Application Laid-Open No. 2009-223866, it takes time to return from the power-saving state to a standby state. In the image forming apparatus discussed in Japanese Patent Application Laid-Open No. 2009-223866, when a factor for returning the image forming apparatus from the power-saving state has been detected, power is supplied to the CPU of the main system and the CPU of the subsystem. The CPU of the main system then executes a boot program developed in a random access memory (RAM) of the main system. Subsequently, the CPU of the main system transfers a boot program for the subsystem to a RAM of the subsystem. The CPU of the subsystem executes the boot program developed in the RAM of the subsystem. Thus, according to Japanese Patent Application Laid-Open No. 2009-223866, in a case where the image forming apparatus returns from the power-saving state, the CPU of the main system executes the boot program to perform startup processing. After that, the CPU of the subsystem executes the boot program to start startup processing. Thus, it takes time for the image forming apparatus to return from the power-saving state.

SUMMARY OF THE INVENTION

The present invention is directed to a technique for shortening a time required for an information processing apparatus to return from a power-saving state, more specifically, a technique in which a CPU of a subsystem performs startup processing, independently of startup processing of a main system.

According to an aspect of the present invention, an information processing apparatus includes a main system and a subsystem. The main system includes a first control unit configured to, before the information processing apparatus shifts to a power-saving state, develop a boot image to be executed by the subsystem in a memory of the subsystem. The subsystem includes a second control unit configured to, in a case where the information processing apparatus returns from the power-saving state, issue an instruction to execute the boot image developed in the memory. The subsystem further includes a third control unit configured to execute the boot image developed in the memory according to the instruction issued by the second control unit.

Further features of the present invention will become apparent from the following description of exemplary embodiments with reference to the attached drawings.

BRIEF DESCRIPTION OF THE DRAWINGS

FIG. 9 is a flowchart illustrating processing performed in a case where an image forming apparatus returns from a power-saving state according to the second exemplary embodiment.

FIG. 10 is a flowchart illustrating processing performed in a case where the image forming apparatus returns from a power-off state according to the second exemplary embodiment.

DESCRIPTION OF THE EMBODIMENTS

Exemplary embodiments of the present invention will be described below with reference to the drawings.

Figure 1:
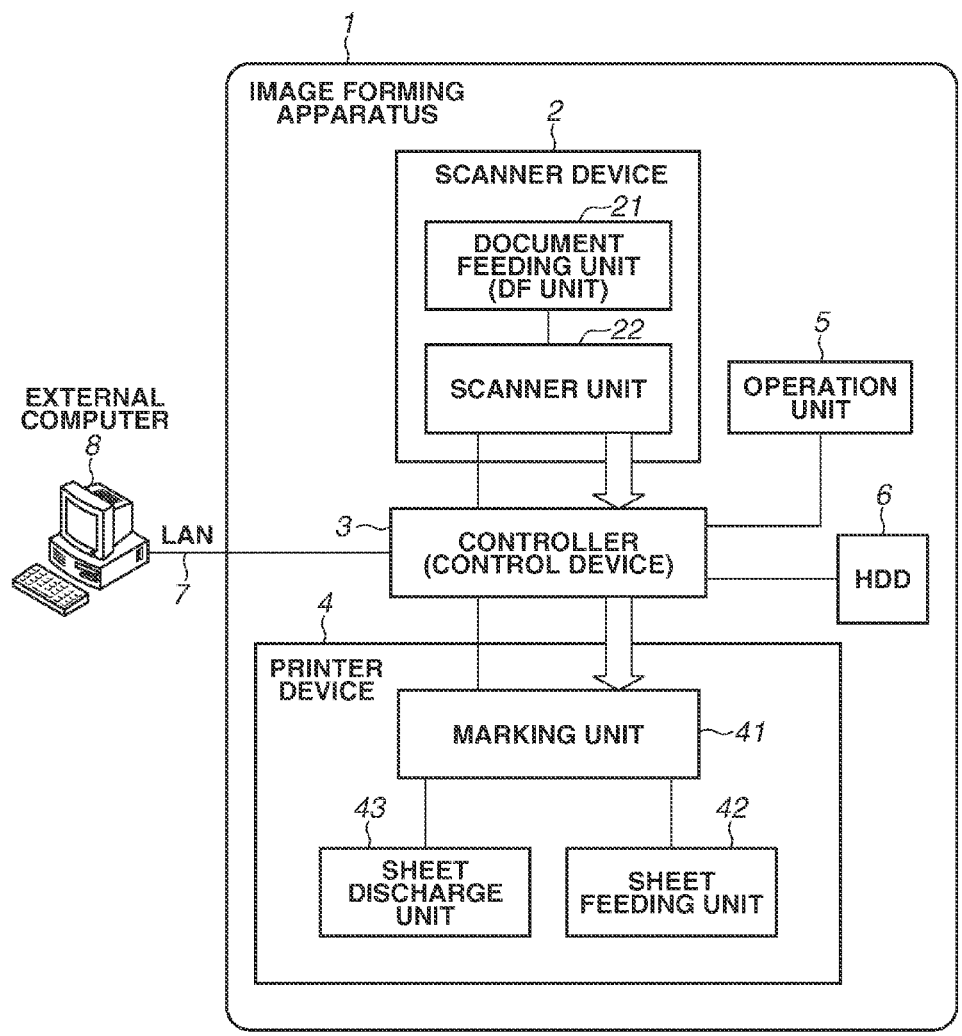
FIG. 1 is a block diagram illustrating an image forming apparatus according to a first exemplary embodiment.

FIG. 1 illustrates an entire configuration of an image forming apparatus according to a first exemplary embodiment of the present invention.

An image forming apparatus (information processing apparatus) 1 according to the present exemplary embodiment includes a scanner device 2, a controller 3, a printer device 4, an operation unit 5, and a hard disk drive 6.

The scanner device 2 optically reads an image from a document and converts the read image into a digital image. The printer device 4 outputs the digital image onto a sheet. The operation unit 5 includes various buttons operated by a user and a display unit.

The hard disk drive 6 stores the digital image and a control program.

The image forming apparatus 1 can receive information such as a print instruction from an external computer 8 via a local area network (LAN) 7. The image forming apparatus 1 also includes the controller 3 that controls the scanner device 2 and the printer device 4. Details of the controller 3 will be described below.

The scanner device 2 includes a document feeding unit 21 that automatically feeds a bundle of documents set on a tray to a reading position, and a scanner unit 22 that optically scans a document fed to the reading position and acquires digital image data from the document. The digital image data acquired by the scanner unit 22 is transmitted to the controller 3.

The printer device 4 includes a sheet feeding unit 42 that feeds the sheets stored in a cassette one by one, a marking unit 41 that performs printing on the fed sheets based on the image data, and a sheet discharge unit 43 that discharges the sheets subjected to the printing.

Figure 2:
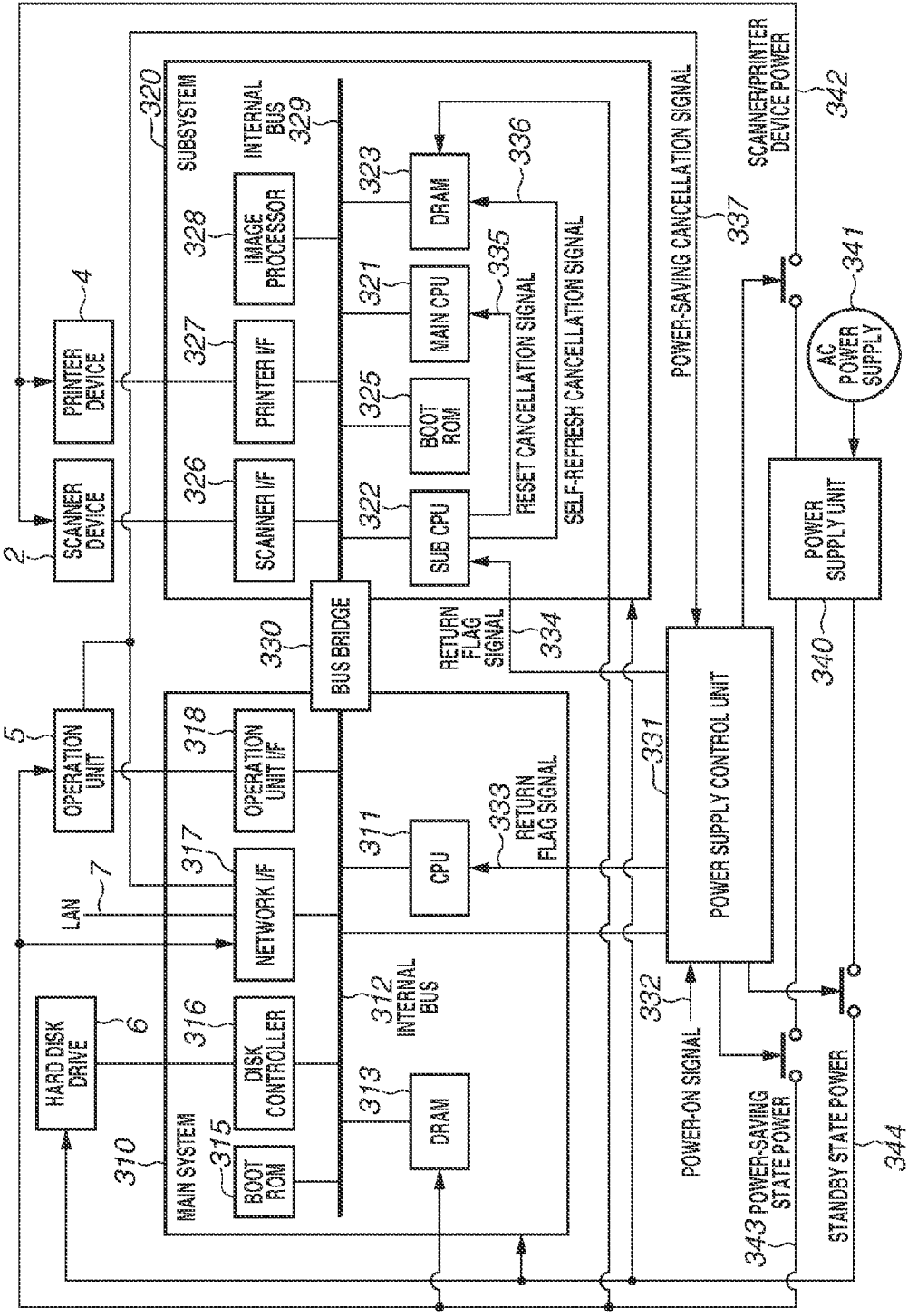
FIG. 2 is a block diagram illustrating details of a controller according to the first exemplary embodiment.

FIG. 2 is a block diagram illustrating the controller 3.

The controller 3 will be described in detail with reference to FIG. 2.

The controller 3 includes a main system 310 and a subsystem 320. The main system 310 and the subsystem 320 are connected so as to be able to communicate with each other.

The main system 310 is a so-called general-purpose CPU system. The main system 310 mainly includes a CPU 311, a boot read-only memory (ROM) 315, a dynamic random access memory (DRAM) 313, a disk controller 316, a network interface 317, and an operation unit interface 318.

The CPU 311 controls the entire main system 310. The boot ROM 315 stores an initial startup program called a basic input/output system (BIOS) to be executed by the CPU 311. The boot ROM 315 is a flash ROM capable of rewriting data. The DRAM 313 is a main memory in which data and a program to be used by the CPU 311 are developed. An operating system (OS) and an application program to be executed by the CPU 311 are developed in the DRAM 313.

The disk controller 316 controls writing of data into the hard disk drive 6 and reading of data from the hard disk drive 6. The hard disk drive 6 stores the above-described OS and the application program to be developed in the DRAM 313.

The LAN 7 is connected to the network interface 317, and the operation unit 5 is connected to the operation unit interface 318. The network interface 317 is a LAN card, for example.

The above-described units in the main system 310 are connected to one another via an internal bus (e.g., Peripheral Component Interconnect (PCI) Express bus) 312.

The subsystem 320 includes a general-purpose CPU system, which is smaller than the main system 310, and image processing hardware (an image processor 328).

In the present exemplary embodiment, the subsystem 320 includes two CPUs (a main CPU 321 and a sub CPU 322). The subsystem 320 further includes a DRAM 323, a boot ROM 325, a scanner interface 326, and a printer interface 327.

The main CPU 321 transmits image data to the image processor 328 to perform image processing on the image data, and transmits the image data, which has been subjected to the image processing, to the printer device 4. The sub CPU 322 issues an instruction to write data into the hard disk drive 6 and issues an instruction to read out data from the hard disk drive 6. Processing to be performed by the main CPU 321 and the sub CPU 322 is not limited to the above-described processing.

The DRAM 323 is a main memory in which data and a program to be used by the main CPU 321 are developed. The OS and the application program to be executed by the main CPU 321 are developed in the DRAM 323. The DRAM 323 also functions as an image memory that is a memory area for temporarily storing image data.

The above-described OS to be developed in the DRAM 323 is stored in the hard disk drive 6. The CPU 311 of the main system 310 transfers the OS for the subsystem 320 from the hard disk drive 6 to the DRAM 323.

The boot ROM 325 stores a boot program to be executed by the sub CPU 322. The sub CPU 322 according to the present exemplary embodiment can cancel a reset state of the main CPU 321 by executing the boot program stored in the boot ROM 325. The boot ROM 325 is a flash ROM capable of rewriting data.

The term "reset" means setting a program counter to zero or returning a state that an internal circuit has to an initial state. When the reset state is canceled, the program counter starts to operate.

The DRAM 323 according to the present exemplary embodiment is set to a self-refresh mode while the image forming apparatus 1 is in a power-saving state. The DRAM 323 may have a Partial Array Self Refresh (PASR) function. The PASR function is to save power in such a way to not shift an entire area of the DRAM 323 to a self-refresh state but shift only a set partial area of the DRAM 323 to the self-refresh state to stop supplying power to the remaining area.

The image processor 328 performs digital image processing in real time. The scanner device 2 is connected to the scanner interface 326. The printer device 4 is connected to the printer interface 327.

The above-described units in the subsystem 320 are connected to one another via an internal bus (e.g., a PCI Express bus) 329.

The internal bus 312 in the main system 310 and the internal bus 329 in the subsystem 320 are connected to each other via a bus bridge 330. In the present exemplary embodiment, a root complex is the main system 310, and an end point is the subsystem 320.

The DRAM 313 and the DRAM 323 are non-volatile DRAMs, and cannot store data while the power to the image forming apparatus 1 is off. Thus, while the power to the image forming apparatus 1 is off, programs (the OS and the application program) developed in the DRAM 313 or the DRAM 323 are stored in the hard disk drive 6. When the power to the image forming apparatus 1 has been turned on, the OS and the application program for the main system 310 are developed in the DRAM 313 from the hard disk drive 6. When the power to the image forming apparatus 1 has been turned on, the OS and the application program for the subsystem 320 are developed in the DRAM 323 from the hard disk drive 6.

As illustrated in FIG. 2, the image forming apparatus 1 includes a power supply control unit 331 that controls a power state of the image forming apparatus 1. The power supply control unit 331 has a Complex Programmable Logic Device (CPLD).

The image forming apparatus 1 also includes a power supply unit 340 that generates direct current (DC) power from alternating current (AC) power that is input from an AC power supply 341. The power supply unit 340 generates scanner/printer device power 342, power-saving state power 343, and standby state power 344.

The scanner/printer device power 342 is supplied to the scanner device 2 and the printer device 4. The power-saving state power 343 is supplied to the network interface 317, the operation unit 5, the DRAM 313, and the DRAM 323. The standby state power 344 is supplied to the hard disk drive 6, the main system 310, and the subsystem 320.

While the image forming apparatus 1 is in a standby state, the scanner/printer device power 342, the standby state power 344, and the power-saving state power 343 are supplied to the corresponding units in the image forming apparatus 1. While the image forming apparatus 1 is in the power-saving state, the power-saving state power 343 is supplied to the network interface 317, the operation unit 5, the DRAM 313, and the DRAM 323. On the other hand, while the image forming apparatus 1 is in the power-saving state, the scanner/printer device power 342 and the standby state power 344 are not supplied to the image forming apparatus 1. While the image forming apparatus 1 is in a power-off state, none of the scanner/printer device power 342, the standby state power 344, and the power-saving state power 343 is supplied to the image forming apparatus 1.

The supplies of the above-described scanner/printer device power 342, the power-saving state power 343, and the standby state power 344 are individually controlled by the power supply control unit 331.

A line with an arrow extending from the power supply control unit 331 illustrated in FIG. 2 represents a signal line, and a line with an arrow extending from the power supply unit 340 represents a power supply line.

Next, each of the signal lines will be described in detail with reference to FIG. 2.

A power-on signal 332 is input to the power supply control unit 331 when a power supply switch (not illustrated) in the image forming apparatus 1 has been turned on by a user operation.

A return flag signal 333 is a signal for controlling a register indicating whether the image forming apparatus 1 has returned from the power-saving state or has returned from the power-off state. The CPU 311 of the main system 310 determines whether the image forming apparatus 1 has returned from the power-saving state or from the power-off state, by referring to the register to be rewritten according to the return flag signal 333.

A return flag signal 334 is a signal for controlling a register indicating whether the image forming apparatus 1 has returned from the power-saving state or has returned from the power-off state. The sub CPU 322 of the subsystem 320 determines whether the image forming apparatus 1 has returned from the power-saving state or from the power-off state, by referring to the register to be rewritten according to the return flag signal 334.

A reset cancellation signal 335 is a signal for canceling the reset state of the main CPU 321. The sub CPU 322 controls the reset cancellation signal 335 on the condition that the main CPU 321 has entered an operable state (that a voltage supplied to the main CPU 321 has been stabilized), to cancel the reset state of the main CPU 321. Accordingly, the main CPU 321 starts to execute the OS and the application program developed in the DRAM 323.

A self-refresh cancellation signal 336 is a signal for issuing an instruction to cancel, in a case where the DRAM 323 is in the self-refresh state, the self-refresh state of the DRAM 323. Control of the self-refresh cancellation signal 336 causes the DRAM 323 to cancel the self-refresh state and return to a normal state. In the present exemplary embodiment, the sub CPU 322 controls the self-refresh cancellation signal 336 to cancel the self-refresh state of the DRAM 323.

A power-saving cancellation signal 337 is a signal for shifting the image forming apparatus 1 to the standby state in a case where the image forming apparatus 1 is in the power-saving state. When the power-saving cancellation signal 337 has been input to the power supply control unit 331, the power supply control unit 331 controls the power supply unit 340 so that the standby state power 344 is supplied to the image forming apparatus 1. The power-saving cancellation signal 337 is input to the power supply control unit 331, triggered by the operation unit 5 being operated by the user or the network interface 317 receiving a packet from the external computer 8.

Next, an operation of the controller 3 will be described, in which copying an image onto a paper medium is taken as an example.

When the user issues an instruction to copy an image via the operation unit 5, the CPU 311 instructs the main CPU 321 to cause the scanner device 2 to perform a scanning operation. More specifically, in response to receiving the instruction from the CPU 311, the main CPU 321 transmits an image reading instruction to the scanner device 2 via the scanner interface 326. The scanner device 2 optically scans a paper document, converts the scanned document into digital image data, and then outputs the digital image data to the image processor 328 via the scanner interface 326. The image processor 328 temporarily stores the digital image data in the DRAM 323 serving as an image memory.

When confirming that a predetermined amount of or all the digital image data has been stored in the DRAM 323, the CPU 311 instructs the main CPU 321 to cause the printer device 4 to perform a printing operation. More specifically, in response to receiving the instruction from the CPU 311, the main CPU 321 transmits an image output instruction to the printer device 4 via the printer interface 327. The main CPU 321 notifies the image processor 328 of the location of the image data in the DRAM 323. The image processor 328 transmits the image data to the printer device 4 via the printer interface 327 according to a synchronization signal from the printer device 4. Accordingly, the printer device 4 prints the digital image data on the paper medium.

<Processing for Shifting to Power-Saving State>

Figure 4:
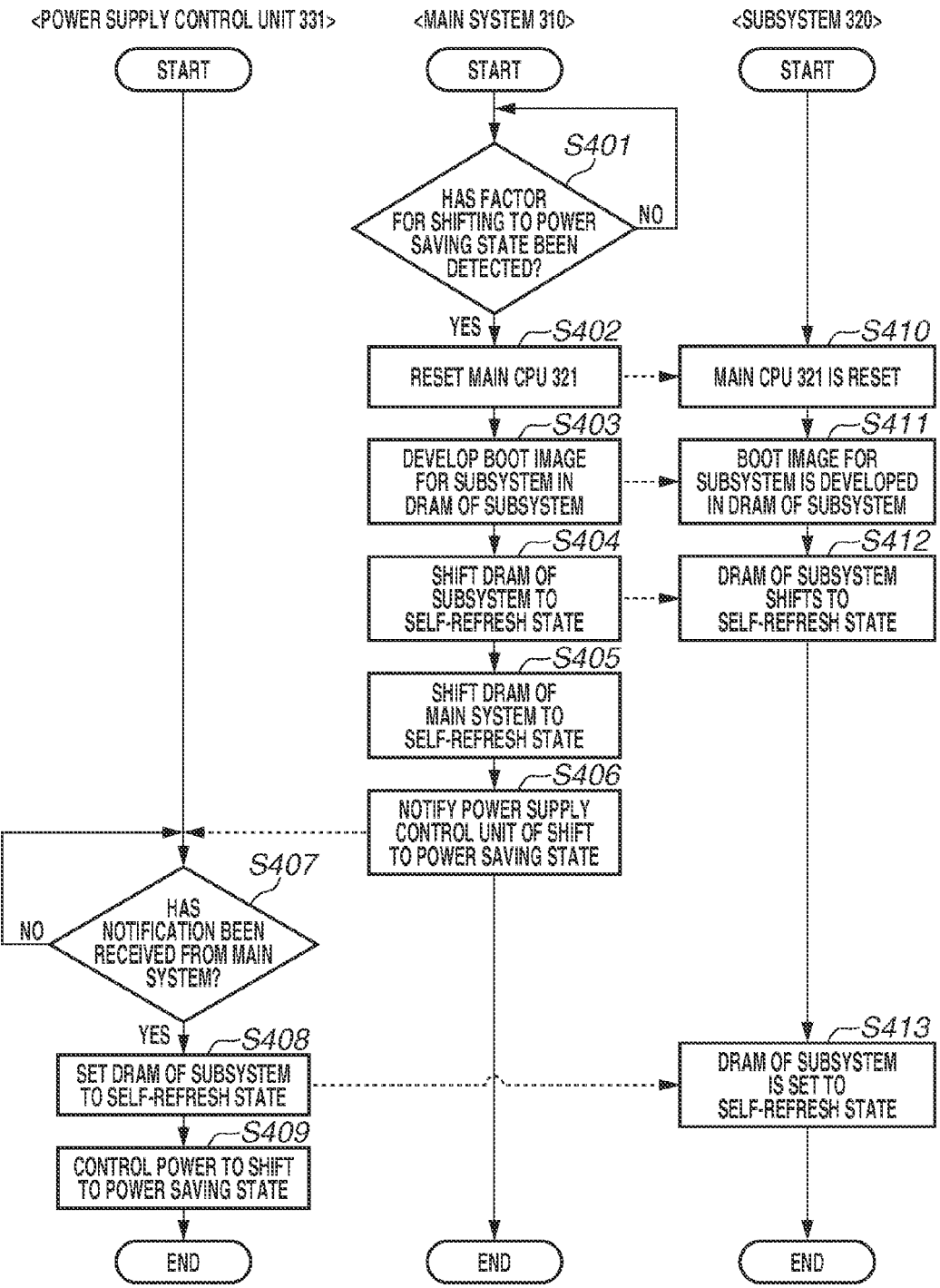
FIG. 4 is a flowchart illustrating processing performed in a case where the image forming apparatus shifts to the power-saving state according to the first exemplary embodiment.

Processing performed in a case where the image forming apparatus 1 shifts to the power-saving state will be described below with reference to FIG. 4.

In step S401, the CPU 311 of the main system 310 first determines whether a factor for shifting the image forming apparatus 1 to the power-saving state has been detected. Examples of the factor for shifting the image forming apparatus 1 to the power-saving state are as follows:

The network interface 317 did not receive a print job within a predetermined period of time.

The operation unit 5 was not operated within a predetermined period of time.

A power-saving shift button (not illustrated) provided in the operation unit 5 has been operated.

If the CPU 311 determines that the factor has been detected (YES in step S401), then in step S402, the CPU 311 resets the main CPU 321 of the subsystem 320. Resetting the main CPU 321 can prevent the main CPU 321 from accessing the DRAM 323 while a boot image is developed in the DRAM 323 of the subsystem 320 in steps S403 and S411 to be described below.

In step S403, the CPU 311 develops the boot image for the subsystem 320, which is stored in the hard disk drive 6, in the DRAM 323 of the subsystem 320. In the present exemplary embodiment, by developing the boot image for the main CPU 321 in the DRAM 323 when the image forming apparatus 1 is to shift to the power-saving state, the CPU 311 does not need to develop the boot image for the subsystem 320 in the DRAM 323 when the image forming apparatus 1 is to return from the power-saving state. As a result, the time required for the image forming apparatus 1 to return from the power-saving state to the standby state can be shortened.

After developing the boot image for the subsystem 320 in the DRAM 323, in step S404, the CPU 311 shifts the DRAM 323 to the self-refresh state. More specifically, the CPU 311 controls a clock enable (CKE) signal and a RESET signal input to the DRAM 323 and performs control to transmit a self-refresh command to the DRAM 323, so that the DRAM 323 enters the self-refresh state.

In step S405, the CPU 311 also shifts the DRAM 313 of the main system 310 to the self-refresh state. In step S406, the CPU 311 notifies the power supply control unit 331 that the image forming apparatus 1 is to shift to the power-saving state.

In step S407, when the power supply control unit 331 has received the notification from the CPU 311 (YES in step S407), then in step S408, the power supply control unit 331 performs setting so that the DRAM 323 of the subsystem 320 is maintained in the self-refresh state. The power supply control unit 331 sets an external pin of the subsystem 320 to the self-refresh state so that the DRAM 323 is maintained in the self-refresh state even if the image forming apparatus 1 has shifted to the power-saving state and the supply of power to the subsystem 320 has been stopped. With this setting, states of the CKE signal and the RESET signal can be maintained even if the supply of power to the subsystem 320 has been stopped.

Figure 3:
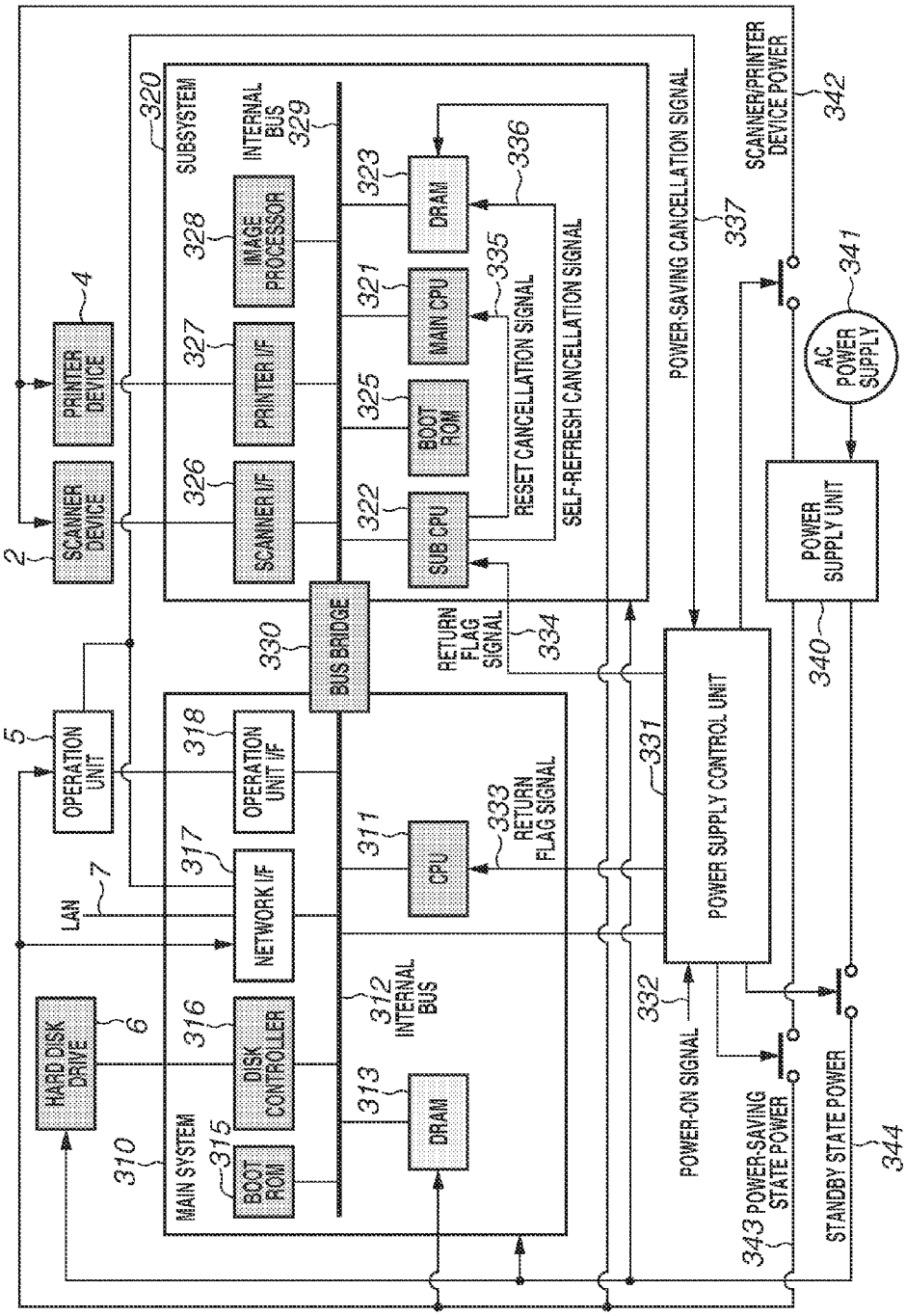
FIG. 3 is a block diagram illustrating a state of the image forming apparatus in a power-saving state according to the first exemplary embodiment.

In step S409, the power supply control unit 331 controls the power supply unit 340 to bring the image forming apparatus 1 into the power-saving state. More specifically, the power supply control unit 331 stops supplying the standby state power 344 to the image forming apparatus 1 to bring the image forming apparatus 1 into the power-saving state. In the power-saving state, the DRAM 313 and the DRAM 323 are in the self-refresh state, as illustrated in FIG. 3.

In step S410, in the subsystem 320, the main CPU 321 is brought into a reset state under the control of the CPU 311 of the main system 310. In step S411, the boot image for the subsystem 320 is developed in the DRAM 323 of the subsystem 320. In step S412, the DRAM 323 in which the boot image has been developed shifts to the self-refresh state by receiving the self-refresh command from the CPU 311. In step S413, the subsystem 320 is set by the power supply control unit 313 so that the DRAM 323 is maintained in the self-refresh state.

<Processing for Returning from Power-Saving State>

Figure 5:
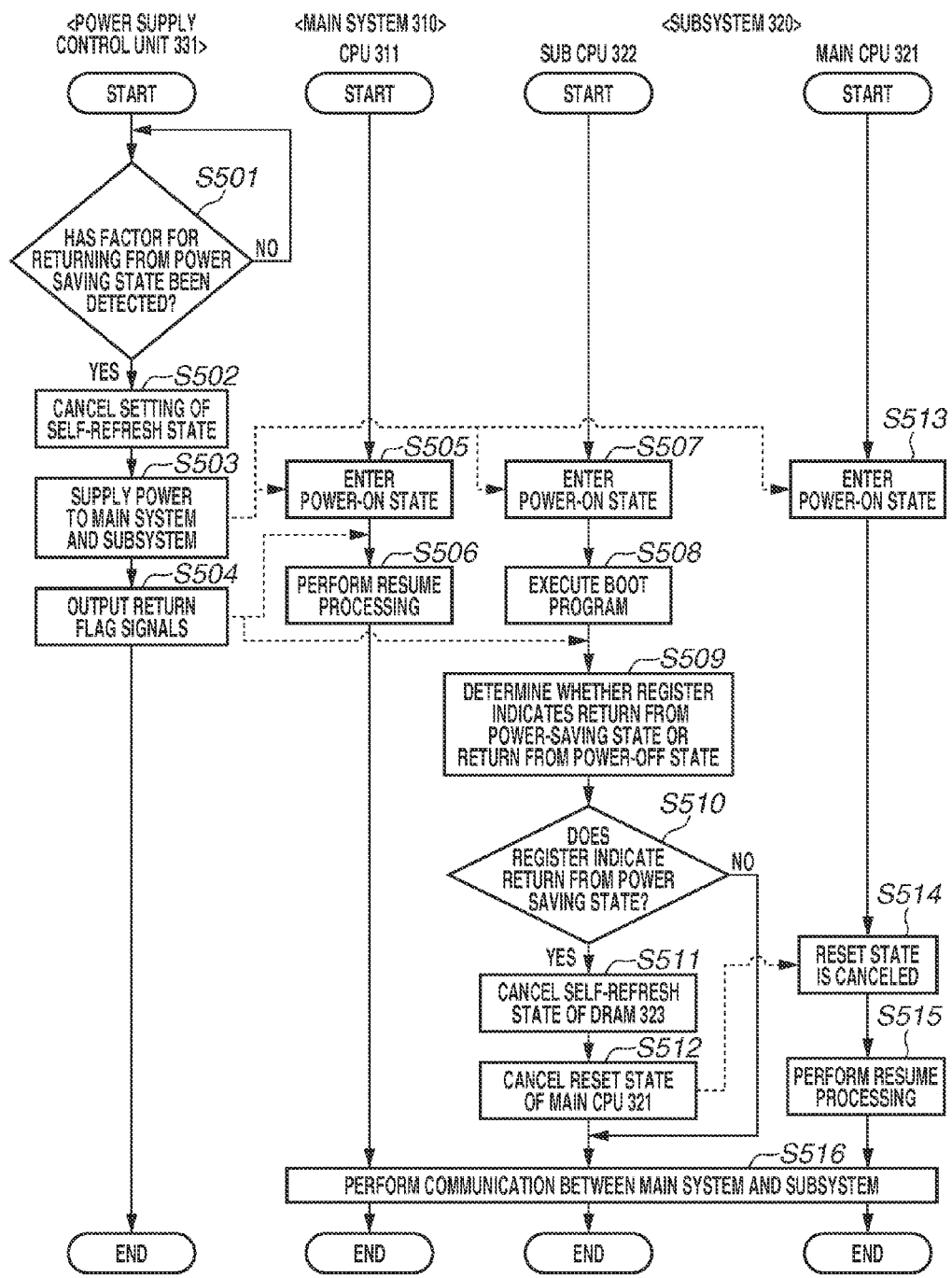
FIG. 5 is a flowchart illustrating processing performed in a case where the image forming apparatus returns from the power-saving state according to the first exemplary embodiment.

Next, processing for returning the image forming apparatus 1 from the power-saving state will be described with reference to FIG. 5.

In step S501, the power supply control unit 331 first determines whether a factor for returning from the power-saving state (the power-saving cancellation signal 337) has been detected. Examples of the factor for returning from the power-saving state are that the network interface 317 has received a print job and that the power-saving shift button provided in the operation unit 5 has been operated.

When the power supply control unit 331 determines that the power-saving cancellation signal 337 has been detected (YES in step S501), then in step S502, the power supply control unit 331 cancels the setting performed in step S408. More specifically, the power supply control unit 331 sets the external pin of the subsystem 320 to a normal mode.

In step S503, the power supply control unit 331 controls the power supply unit 340 to perform control so that power is supplied to the main system 310 and the subsystem 320. In step S504, the power supply control unit 331 outputs the return flag signal 333 and the return flag signal 334 each indicating that the image forming apparatus 1 has returned from the power-saving state. The register in the main system 310 is set to the value indicating that the image forming apparatus 1 has returned from the power-saving state, according to the state of the return flag signal 333. The register in the subsystem 320 is set to the value indicating that the image forming apparatus 1 has returned from the power-saving state, according to the state of the return flag signal 334.

In step S505, power is supplied to the CPU 311 of the main system 310. In step S506, the CPU 311 performs resume processing of the main system 310. More specifically, the CPU 311 performs processing for shifting to the standby state using data stored in the DRAM 313 being in the self-refresh state. In the resume processing, the self-refresh state of the DRAM 313 is canceled.

In step S507, power is supplied to the sub CPU 322 of the subsystem 320. In step S508, the sub CPU 322 executes the boot program stored in the boot ROM 325, independently of the resume processing of the main system 310.

In step S509, the sub CPU 322 determines by referring to the register whether the image forming apparatus 1 has returned from the power-saving state or from the power-off state. In step S510, if the value of the register is determined to indicate that the image forming apparatus 1 has returned from the power-saving state (YES in step S510), then in step S511, the sub CPU 322 cancels the self-refresh state of the DRAM 323. More specifically, the sub CPU 322 controls the self-refresh cancellation signal 336 to cancel the self-refresh state of the DRAM 323.

In step S512, the sub CPU 322 cancels the reset state of the main CPU 321. More specifically, the sub CPU 322 controls the reset cancellation signal 335 to cancel the reset state of the main CPU 321.

In step S513, power is supplied to the main CPU 321. In step S514, the reset state of the main CPU 321 is canceled. In step S515, the main CPU 321 is resumed using the boot image stored in the DRAM 323 in the self-refresh state.

In step S516, when the main CPU 321 has been resumed, negotiation communication is performed between the main system 310 and the subsystem 320.

By the foregoing processing, the image forming apparatus 1 returns from the power-saving state to the standby state.

<Processing for Returning from Power-Off State>

Figure 6:
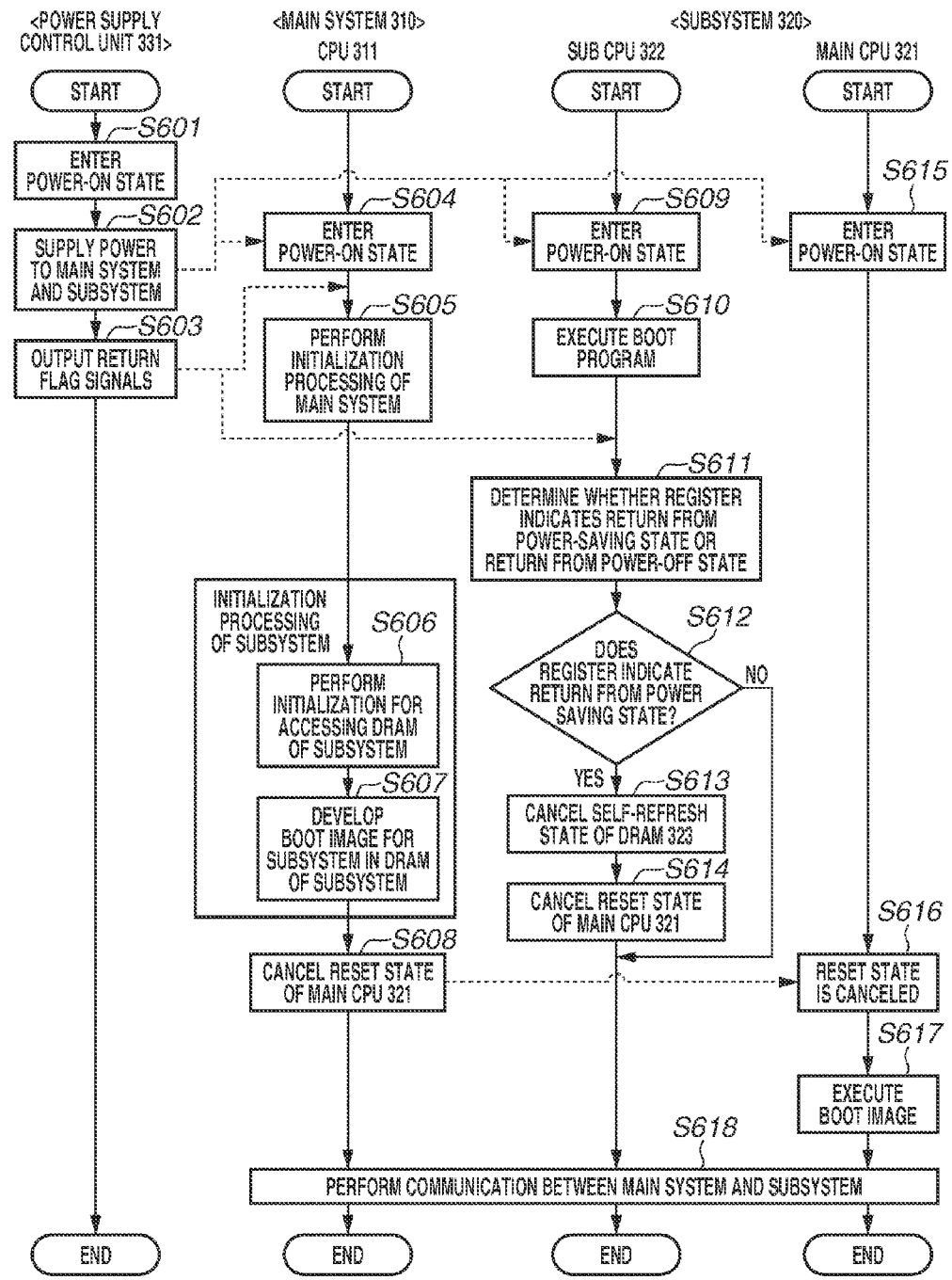
FIG. 6 is a flowchart illustrating processing performed in a case where the image forming apparatus returns from a power-off state according to the first exemplary embodiment.

Next, processing for returning the image forming apparatus 1 from the power-off state will be described with reference to FIG. 6.

In step S601, power is supplied from the power supply unit 340 to the power supply control unit 331 when the user turns on a power switch (not illustrated). In step S602, the power supply control unit 331, to which power has been supplied, controls the power supply unit 340 to perform control so that power is supplied to the main system 310 and the subsystem 320. In step S603, the power supply control unit 331 outputs the return flag signal 333 and the return flag signal 334 each indicating that the image forming apparatus 1 has returned from the power-off state. The register in the main system 310 is set to the value indicating that the image forming apparatus 1 has returned from the power-off state, according to the state of the return flag signal 333. The register in the subsystem 320 is set to the value indicating that the image forming apparatus 1 has returned from the power-off state, according to the state of the return flag signal 334.

In step S604, power is supplied to the CPU 311 of the main system 310. In step S605, the CPU 311 performs initialization processing of the main system 310 by referring to the value of the set register. More specifically, the CPU 311 executes the BIOS stored in the boot ROM 315 to initialize the disk controller 316 and access the hard disk drive 6. The CPU 311 then develops the OS and the application program for the main system 310 in the DRAM 313 from the hard disk drive 6. The CPU 311 executes the OS and the application program, which have been developed in the DRAM 313, to initialize each of peripheral devices (the network interface 317 and the operation unit interface 318) in the main system 310.

In step S606, the CPU 311 performs initialization processing of the subsystem 320. More specifically, in step S606, the CPU 311 performs initialization for accessing the DRAM 323 of the subsystem 320. In step S607, the CPU 311 reads out the boot image for the subsystem 320 stored in the hard disk drive 6, and develops the read boot image in the DRAM 323 of the subsystem 320.

In step S608, the CPU 311 cancels the reset state of the main CPU 321 of the subsystem 320.

On the other hand, in step S609, power is supplied to the sub CPU 322 of the subsystem 320. Then in step S610, the sub CPU 322 executes the boot program stored in the boot ROM 325.

In step S611, the sub CPU 322 determines whether the image forming apparatus 1 has returned from the power-saving state or from the power-off state, by referring to the register. In step S612, if the value of the register is determined to indicate that the image forming apparatus 1 has returned from the power-off state (NO in step S612), the sub CPU 322 waits until the main CPU 321 is started. Steps S613 and S614 are not performed since an example in which the image forming apparatus 1 returns from the power-off state is illustrated in FIG. 6.

In step S615, power is supplied to the main CPU 321 of the subsystem 320. Then in step S616, the reset state of the main CPU 321 is cancelled by the CPU 311 of the main system 310. In step S617, the main CPU 321 of which the reset state has been canceled is started using the boot image developed in the DRAM 323 by the CPU 311. In step S618, when the startup of the main CPU 321 has been completed, negotiation communication is performed between the main system 310 and the subsystem 320.

By the foregoing processing, the image forming apparatus 1 returns from the power-off state to the standby state.

<Advantages of First Exemplary Embodiment>

Figure 7A:
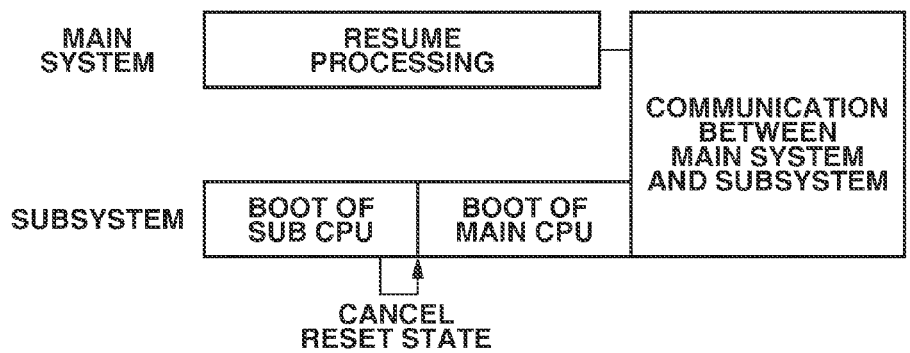
FIGS. 7A and 7B illustrate a comparison in return from a power-saving state between the image forming apparatus according to the first exemplary embodiment and a conventional image forming apparatus.

In a case where the image forming apparatus 1 returns from the power-saving state, as illustrated in FIG. 7A, the sub CPU 322 of the subsystem 320 cancels the reset state of the main CPU 321, independently of the resume processing of the main system 310. Thus, the subsystem 320 is resumed without waiting until the resume processing of the main system 310 is completed. As a result, the time required for the image forming apparatus 1 to return from the power-saving state can be shortened.

Figure 7B:
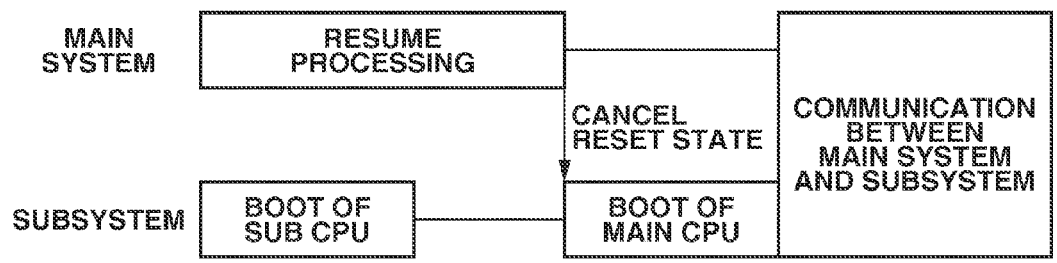
Figure 8:
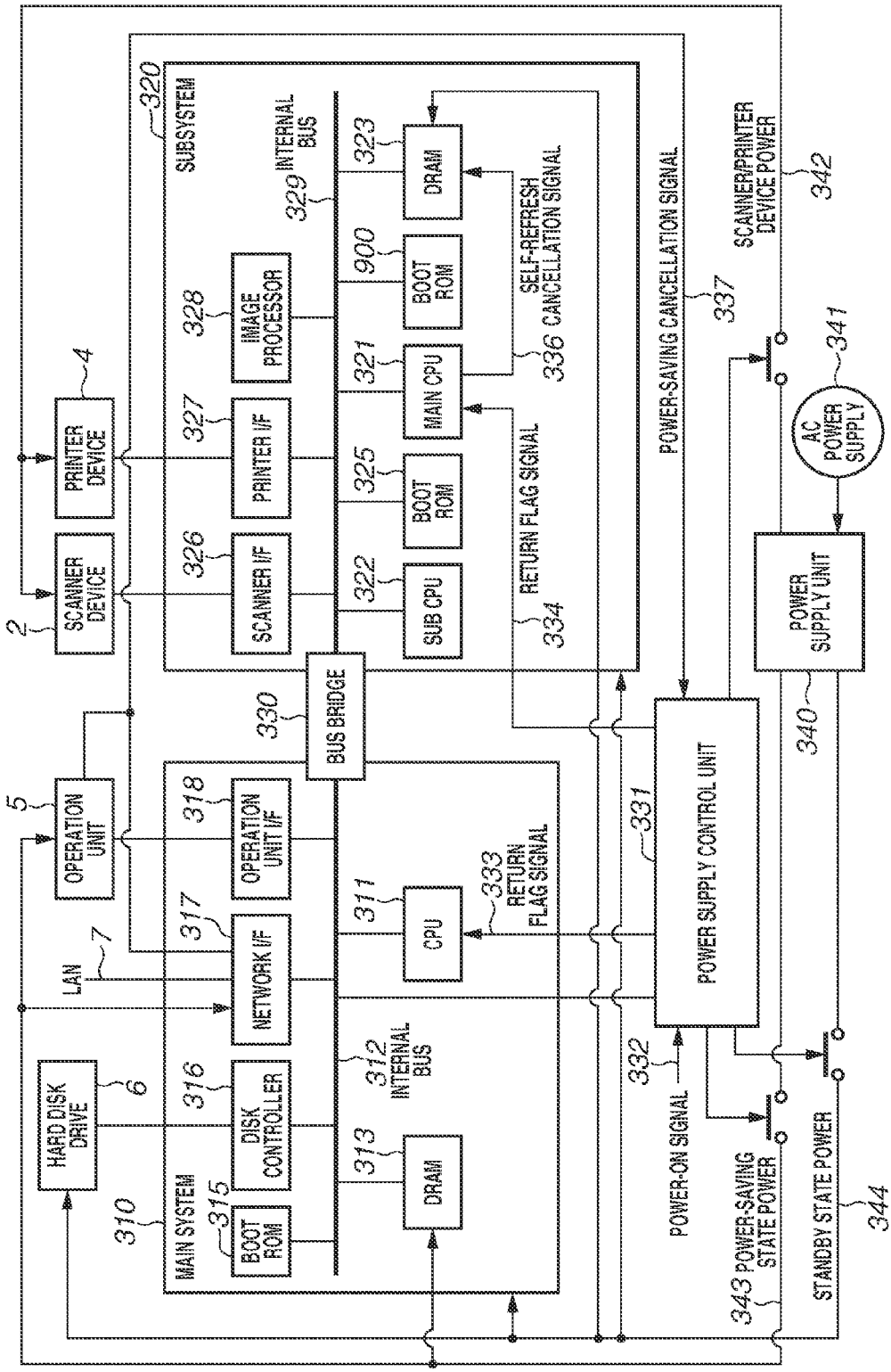
FIG. 8 is a block diagram illustrating details of a controller according to a second exemplary embodiment.

On the other hand, in the conventional image forming apparatus, the reset state of the main CPU 321 of the sub system 320 is canceled after the resume processing of the main system 310 is completed, as illustrated in FIG. 7B. Therefore, the time required for the conventional image forming apparatus illustrated in FIG. 7B to return from the power-saving state is longer than the time required for the image forming apparatus 1 according to the present exemplary embodiment illustrated in FIG. 7A to return from the power-saving state.

Also in the present exemplary embodiment, the boot image for the subsystem 320 can be developed in the DRAM 323 in advance before the image forming apparatus 1 shifts to the power-saving state. This can shorten the time required for the image forming apparatus 1 to return from the power-saving state, compared to the case where the boot image is developed in the DRAM 323 when the image forming apparatus 1 is to return from the power-saving state.

Further, in the present exemplary embodiment, the DRAM 323 is brought into the self-refresh state to retain the boot image developed in the DRAM 323. This can prevent, even if the supply of power to the subsystem 320 is stopped in the power-saving state, the boot image developed in the DRAM 323 from volatizing.

A second exemplary embodiment will be described below. In the first exemplary embodiment, an example in which the CPU 311 of the main system 310 develops the boot image for the subsystem 320 in the DRAM 323 of the subsystem 320 has been described. In the first exemplary embodiment, the subsystem 320 is configured not to include a boot ROM storing the boot program for the main CPU 321 and thus, the sub CPU 322 of the subsystem 320 cancels the reset state of the main CPU 321.

On the other hand, in the second exemplary embodiment, the main CPU 321 (sub control unit) of the subsystem 320 includes a boot ROM 900 storing the boot program. A difference from the first exemplary embodiment is that the subsystem 320 includes the boot ROM 900 storing the boot program for the main CPU 321. The boot ROM 900 is a flash ROM.

The boot program stored in the boot ROM 900 includes a code for canceling the self-refresh state of the DRAM 323 and a code for jumping to a reset vector address for executing the OS and the like developed in the DRAM 323.

<Processing for Returning from Power-Saving State>

Next, processing for returning the image forming apparatus 1 according to the second exemplary embodiment from a power-saving state will be described with reference to FIG. 9.

In step S901, the power supply control unit 331 first determines whether a factor for returning from the power-saving state (the power-saving cancellation signal 337) has been detected.

If the power supply control unit 331 determines that the power-saving cancellation signal 337 has been detected (YES in step S901), then in step S902, the power supply control unit 331 cancels the setting performed in step S408.

More specifically, the power supply control unit 331 sets the external pin of the subsystem 320 to a normal mode.

In step S903, the power supply control unit 331 controls the power supply unit 340 to perform control so that power is supplied to the main system 310 and the subsystem 320. In step S904, the power supply control unit 331 outputs the return flag signal 333 and the return flag signal 334 each indicating that the image forming apparatus 1 has returned from the power-saving state. The register in the main system 310 is set to the value indicating that the image forming apparatus 1 has returned from the power-saving state, according to the state of the return flag signal 333. The register in the subsystem 320 is set to the value indicating that the image forming apparatus 1 has returned from the power-saving state, according to the state of the return flag signal 334.

In step S905, power is supplied to the CPU 311 (main control unit) of the main system 310. In step S906, the CPU 311 performs resume processing of the main system 310. More specifically, the CPU 311 performs processing for shifting to a standby state using data stored in the DRAM 313 in the self-refresh state. In the resume processing, the self-refresh state of the DRAM 313 is canceled.

In step S907, power is supplied to the sub CPU 322 of the subsystem 320. Then in step S908, the sub CPU 322 executes the boot program stored in the boot ROM 325, independently of the resume processing of the main system 310.

In step S909, power is supplied to the main CPU 321 of the subsystem 320. Then in step S910, the main CPU 321 executes the boot program stored in the boot ROM 900.

In step S911, the main CPU 321 determines whether the image forming apparatus 1 has returned from the power-saving state or has returned from a power-off state, by referring to the register. In step S912, if the value of the register is determined to indicate that the image processing apparatus 1 has returned from the power-saving state (YES in step S912), then in step S913, the main CPU 321 cancels the self-refresh state of the DRAM 323. More specifically, the main CPU 321 controls the self-refresh cancellation signal 336 to cancel the self-refresh state of the DRAM 323.

In step S914, the main CPU 321 jumps to the reset vector address to execute the boot image developed in the DRAM 323. By executing the boot image developed in the DRAM 323, the main CPU 321 completes the resume processing.

In step S917, when the main CPU 321 has completed the resume processing, negotiation communication is performed between the main system 310 and the subsystem 320.

By the foregoing processing, the image forming apparatus 1 returns from the power-saving state to the standby state.

<Processing for Returning from Power-Off State>

Next, processing for returning the image forming apparatus 1 from the power-off state will be described with reference to FIG. 10.

Processes in steps S1001 to S1010 illustrated in FIG. 10 are similar to the processes in steps S601 to S610 in the first exemplary embodiment, and hence the description thereof will be omitted.

In step S1012, power is supplied to the main CPU 321 of the subsystem 320. Then in step S1013, the CPU 321 executes the boot program stored in the boot ROM 900.

In step S1014, the main CPU 321 determines whether the image forming apparatus 1 has returned from the power-saving state or from the power-off state, by referring to the register. In step S1015, when the value of the register is determined to indicate that the image forming apparatus 1 has returned from the power-off state (NO in step S1015), the main CPU 321 waits until the CPU 311 of the main system 310 cancels the reset state of the main CPU 321. In step S1018, when the CPU 311 has canceled the reset state of the main CPU 321, then in step S1019, the main CPU 321 executes the boot image developed in the DRAM 323.

In step S1020, when the main CPU 321 has completed the resume processing, negotiation communication is performed between the main system 310 and the subsystem 320.

By the foregoing processing, the image forming apparatus 1 returns from the power-off state to the standby state.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-174492 filed Aug. 28, 2014, which is hereby incorporated by reference herein in its entirety.

What is claimed is:

1. An information processing apparatus comprising:
   a main system which includes a main processor;
   a subsystem which includes a first sub processor, a memory used for storing a program to be executed by the first sub processor, and a second sub processor; and
   a connecting circuit which connects the main system and the subsystem,
   wherein, based on a shift event to shift the information processing apparatus to a power-saving state, the subsystem shifts to a subsystem power-saving state and the main system shifts to a main system power-saving state,
   wherein, after the shift event to shift the information processing apparatus to the power-saving state is detected and before the subsystem shifts to the subsystem power-saving state, the main processor of the main system transfers a boot program of the subsystem from the main system into the memory of the subsystem via the connecting circuit and shifts the memory of the subsystem that has stored the transferred boot program of the subsystem into a self-refresh state, and
   wherein, after a return event to return at least the subsystem from the subsystem power-saving state is detected, the second sub processor causes the memory of the sub system to cancel the self-refresh state and the first sub processor of the subsystem executes, without necessity to transfer the boot program from the main system into the memory of the subsystem after the return event is detected, the boot program that has been transferred into the memory of the subsystem before the subsystem shifts to the subsystem power-saving state and has remained stored in the memory of the subsystem while the subsystem has been in the subsystem power-saving state.

2. The information processing apparatus according to claim 1, wherein the subsystem further includes a second sub processor and a storage unit which stores a boot program of the second sub processor, and
wherein, when the subsystem returns from the subsystem power-saving state, the second sub processor instructs the first sub processor to execute the boot program stored in the memory of the subsystem.

3. The information processing apparatus according to claim 1, wherein the memory of the subsystem is a volatile memory.

4. The information processing apparatus according to claim 2, wherein the second sub processor outputs a reset signal to reset the first sub processor to the first sub processor when the sub system returns from the subsystem power-saving state.

5. The information processing apparatus according to claim 1, wherein when the information processing apparatus returns from a power-off state, the main processor develops a second boot program of the subsystem in the memory of the subsystem, and then instructs the first sub processor to execute the second boot program developed in the memory of the subsystem.

6. The information processing apparatus according to claim 5, wherein the main processor outputs a reset signal to the first sub processor to execute the second boot program developed in the memory of the subsystem.

7. The information processing apparatus according to claim 1, further comprising a power supply controller which controls supplying power to the main system and the subsystem,
wherein the power supply controller stops supplying the power to the first sub processor when the image forming apparatus shifts the subsystem to the subsystem power-saving state.

8. The information processing apparatus according to claim 1, further comprising an image forming unit which forms an image on a sheet,
wherein the subsystem is able to communicate with the image forming unit.

9. The information processing apparatus according to claim 1, wherein the memory is a dynamic random access memory (DRAM).

10. The information processing apparatus according to claim 9, wherein the DRAM stores the subsystem boot program in a self-refresh state.

11. The information processing apparatus according to claim 1,
wherein the subsystem further includes a storage unit which stores a boot program of the second sub processor, and
wherein, based on the return event, the second sub processor instructs the first sub processor to execute the boot program of the subsystem stored in the memory of the subsystem, after the boot program of the second sub processor stored in the storage unit is executed.

12. The information processing apparatus according to claim 1, further comprising a storage device which stores the boot program of the subsystem and which the main system accesses to transfer the boot program into the memory of the subsystem.

13. The information processing apparatus according to claim 1,
wherein, in the power-saving state of the information processing apparatus, the subsystem is in the subsystem power-saving state, and the main system is in the main system power-saving state,
wherein, in the subsystem power-saving state, power is not supplied to the first sub processor, and power is supplied to the memory, and
wherein, in the main system power-saving state, power is not supplied to the main processor.

14. The information processing apparatus according to claim 1,
wherein a device controlled by the main system is different from a device controlled by the subsystem, and
wherein the connecting circuit is a bus bridge connecting the main system to the subsystem.

15. A method for controlling an information processing apparatus comprising a main system and a subsystem, wherein the subsystem includes a first sub processor, a memory used for storing a program to be executed by the first sub processor, a second sub processor, and a connecting circuit which connects the main system and the subsystem, wherein, based on a shift event to shift the information processing apparatus to a power-saving state, the subsystem shifts to a subsystem power-saving state and the main system shifts to a main system power-saving state, the method comprising:
after the shift event to shift the information processing apparatus to the power-saving state is detected and before the subsystem shifts to the subsystem power-saving state, transferring, by using a main processor of the main system, a boot program of the subsystem from the main system into the memory of the subsystem via the connecting circuit, and shifting, by using the main processor of the main system, the memory of the subsystem that has stored the transferred boot program of the subsystem into a self-refresh state; and
after a return event to return at least the subsystem from the subsystem power-saving state is detected, causing, by using the second sub processor of the sub system, the memory of the sub system to cancel the self-refresh state, and executing, by using the first sub processor of the subsystem, without necessity to transfer the boot program from the main system into the memory of the subsystem after the return event is detected, the boot program that has been transferred into the memory of the subsystem before the subsystem shifts to the subsystem power-saving state and has remained stored in the memory of the subsystem while the subsystem has been in the subsystem power-saving state.

16. The method according to claim 15, further comprising:
shifting, by using the main processor of the main system, the memory of the subsystem in which the boot program of the subsystem has been developed into a self-refresh state before the subsystem shifts to the subsystem power-saving state.

17. The method according to claim 16, further comprising:
canceling, by using the first sub processor of the subsystem, the self-refresh state of the memory of the subsystem when the subsystem returns from the subsystem power-saving state.

18. The method according to claim 17, wherein, when the subsystem returns from the subsystem power-saving state, the self-refresh state of the memory of the subsystem is canceled before executing, by using the first sub processor of the subsystem, the boot program developed in the memory of the subsystem.

19. An information processing apparatus comprising:
a main system which includes a main processor;
a subsystem which includes a first sub processor and a memory used for storing a program to be executed by the first sub processor; and
a connecting circuit which connects the main system and the subsystem,
wherein, based on a shift event to shift the information processing apparatus to a power-saving state, the subsystem shifts to a subsystem power-saving state and the main system shifts to a main system power-saving state,
wherein, after the shift event to shift the information processing apparatus to the power-saving state is detected, the main processor of the main system:
resets the first sub processor of the subsystem;
transfers the boot program of the subsystem from the main system into the memory of the subsystem via the connecting circuit after the reset;
sets the memory to a self-refresh mode after the transfer; and
after the setting, instructs a power controller to shift the information processing apparatus to the power-saving state so that the subsystem shifts to the subsystem power-saving state and the main system shifts to the main system power-saving state, the power controller controlling a power state of the information processing apparatus,
wherein, after a return event to return at least the subsystem from the subsystem power-saving state is detected, the first sub processor of the subsystem executes, without necessity to transfer the boot program from the main system into the memory of the subsystem after the return event is detected, the boot program that has been transferred into the memory of the subsystem before the subsystem shifts to the subsystem power-saving state and has remained stored in the memory of the subsystem while the subsystem has been in the subsystem power-saving state.

20. An information processing apparatus comprising:
a main system which includes a main processor;
a subsystem which includes a first sub processor and a memory used for storing a program to be executed by the first sub processor; and
a connecting circuit which connects the main system and the subsystem,
wherein, based on a shift event to shift the information processing apparatus to a power-saving state, the subsystem shifts to a subsystem power-saving state and the main system shifts to a main system power-saving state,
wherein, after the shift event to shift the information processing apparatus to the power-saving state is detected and before the subsystem shifts to the subsystem power-saving state, the main processor of the main system transfers a boot program of the subsystem from the main system into the memory of the subsystem via the connecting circuit,
wherein, based on a return event to return at least the subsystem from the subsystem power-saving state, the first sub processor of the subsystem executes, without necessity to transfer the boot program from the main system into the memory of the subsystem after the return event is detected, the boot program that has been transferred into the memory of the subsystem before the subsystem shifts to the subsystem power-saving state and has remained stored in the memory of the subsystem while the subsystem has been in the subsystem power-saving state, and
wherein, based on another return event to return the information processing apparatus from an off-power state whose power consumption is smaller than the power-saving state, the main processor of the main system transfers the boot program stored in a storage device into the memory of the subsystem via the connecting circuit and the first sub processor of the subsystem executes the boot program transferred into the memory.

21. An information processing apparatus comprising:
a main system which includes a main processor;
a subsystem which includes a sub processor, a memory which is a volatile memory used as a main memory of the sub processor and another sub processor;
a bus bridge which connects the main system and the subsystem; and
a non-volatile storage device which stores data used for booting the subsystem by the sub processor of the subsystem and which is accessed by the main system and is accessed via the main system by the subsystem,
wherein, based on a shift event to shift the information processing apparatus to a power-saving state, the main system shifts to a main system power-saving state in which power is not supplied to the main processor and the subsystem shifts to a subsystem power-saving state in which power is not supplied to the sub processor and the memory operates in self-refresh mode,
wherein, based on the shift event to shift the information processing apparatus to the power-saving state, the main processor of the main system transfers the data used for booting stored in the non-volatile storage device from the main system into the memory of the subsystem via the bus bridge and causes the memory of the subsystem to operate in the self-refresh mode before the subsystem shifts to the subsystem power-saving state, and
wherein, based on a return event to return the information processing apparatus from the power-saving state, the another sub processor causes the memory of the sub system operating in the self-refresh mode to cancel the self-refresh mode and the sub processor of the subsystem executes a boot process using the data that has been transferred via the bus bridge before the return event and has remained stored in the memory of the subsystem while the subsystem has been in the subsystem power-saving state.

22. The information processing apparatus according to claim 21,
wherein, based on the return event to return the information processing apparatus from the power-saving state, the sub processor of the subsystem starts, before the main system finishes returning from the main system power-saving state, to execute the boot process using the data that has been transferred via the bus bridge and has been stored in the memory of the subsystem before the return event.

23. The information processing apparatus according to claim 21, wherein, based on the return event to return the information processing apparatus from the power-saving state, the sub processor of the subsystem starts, without transferring the data used for booting from the main system to the memory of the subsystem via the bus bridge after the return event, to execute the boot process using the data that has been transferred via the bus bridge and has been stored in the memory of the subsystem before the return event.

By the present Amendment and Remarks, Applicant respectfully requests reconsideration of the outstanding Office Action and allowance of the present application.

\* \* \* \* \*